United States Patent
Noda et al.

(10) Patent No.: US 11,155,488 B2
(45) Date of Patent: Oct. 26, 2021

(54) APPARATUS AND METHOD FOR MANUFACTURING POROUS GLASS PREFORM FOR OPTICAL FIBER

(71) Applicant: Shin-Etsu Chemical Co., Ltd., Tokyo (JP)

(72) Inventors: Naoto Noda, Ibaraki (JP); Hitoshi Iinuma, Gunma (JP); Dai Inoue, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 328 days.

(21) Appl. No.: 16/371,118

(22) Filed: Apr. 1, 2019

(65) Prior Publication Data

US 2019/0300419 A1   Oct. 3, 2019

(30) Foreign Application Priority Data

Apr. 2, 2018 (JP) ............................ JP2018-070632

(51) Int. Cl.
      *C03B 37/014*   (2006.01)
(52) U.S. Cl.
      CPC .... *C03B 37/0142* (2013.01); *C03B 37/01413* (2013.01); *C03B 2207/32* (2013.01);
      (Continued)
(58) Field of Classification Search
      None
      See application file for complete search history.

(56) References Cited

U.S. PATENT DOCUMENTS

| 4,314,837 A | 2/1982 | Blankenship |
| 6,351,972 B1 | 3/2002 | Ohtsuka |

(Continued)

FOREIGN PATENT DOCUMENTS

| JP | 557188424 A | 11/1982 |
| JP | 2000159532 A | 6/2000 |

OTHER PUBLICATIONS

Extended European Search Report for counterpart European Application No. 19166406.9, issued by the European Patent Office dated Aug. 16, 2019.

(Continued)

*Primary Examiner* — Lisa L Herring (57) ABSTRACT

A manufacturing method of a porous glass preform for optical fiber by depositing glass microparticles on a starting member, including supplying a vaporizer with organic silicon compound raw material in a liquid state and a carrier gas; in the vaporizer, mixing and vaporizing the organic silicon compound raw material in a liquid state and the carrier gas to convert the organic silicon compound raw material and the carrier gas into a raw material mixed gas; supplying a burner with the raw material mixed gas and a combustible gas, combusting the raw material mixed gas and the combustible gas in the burner, and ejecting $SiO_2$ microparticles generated by the combustion from the burner; and depositing the $SiO_2$ microparticles ejected from the burner on the starting member by repeatedly moving the vaporizer and the burner together, in a synchronized manner, parallel to the starting member in a longitudinal direction thereof.

11 Claims, 5 Drawing Sheets

(52) U.S. Cl.
CPC ...... *C03B 2207/34* (2013.01); *C03B 2207/42* (2013.01); *C03B 2207/81* (2013.01); *C03B 2207/85* (2013.01)

(56) References Cited

U.S. PATENT DOCUMENTS

| | | |
|---|---|---|
| 8,516,855 B2 | 8/2013 | Fogliani |
| 2004/0237595 A1* | 12/2004 | Fogliani .............. C03B 37/0148 65/421 |
| 2005/0155390 A1 | 7/2005 | Nagasu |
| 2013/0133376 A1* | 5/2013 | Fabian ................ C03B 19/1415 65/395 |
| 2014/0349830 A1 | 11/2014 | Trommer |

OTHER PUBLICATIONS

Opposition against counterpart Indian Application IN201914012533, filed by Opponent, Sonal, dated Jul. 14, 2020.
Extended European Search Report for counterpart European Application No. 21159623.4, issued by the European Patent Office dated Jun. 22, 2021.

* cited by examiner

APPARATUS AND METHOD FOR MANUFACTURING POROUS GLASS PREFORM FOR OPTICAL FIBER

The contents of the following Japanese patent application are incorporated herein by reference:
NO. 2018-070632 filed in JP on Apr. 2, 2018

BACKGROUND

1. Technical Field

The present invention relates to a manufacturing apparatus and a manufacturing method of a porous glass preform for optical fiber, including depositing a cladding portion on a starting core preform using an outside deposition technique (OVD).

2. Related Art

An optical fiber preform is manufactured by depositing $SiO_2$ microparticles using OVD or the like on the outside of a core preform, which is manufactured using VAD or the like, and then sintering the resulting member, for example. Conventionally, silicon tetrachloride ($SiCl_4$) is widely used as the silicon compound raw material to deposit the $SiO_2$ microparticles on the outside of the core preform.

The $SiO_2$ microparticles are generated due to the flame hydrolysis reaction of the $SiCl_4$, based on Formula 1 shown below.

$$SiCl_4 + 2H_2O \rightarrow SiO_2 + 4HCl \quad \text{Formula 1:}$$

Hydrochloric acid is formed as a by-product of this reaction, and care must be taken concerning the manufacturing apparatus materials and exhaust temperature management, since this hydrochloric acid is corrosive to metals when mixed with water. Furthermore, when equipment for performing a recover processing of the hydrochloric acid from the exhaust is provided, this results in a cost increase.

Silicon tetrachloride ($SiCl_4$) is widely used as the silicon compound raw material, but sometimes a halogen-free organic silicon compound that does not contain Cl (chlorine) in the molecules is used as the starting material for the $SiO_2$ microparticles. This is exemplified by octamethylcyclotetrasiloxane (OMCTS), which is an organic silicon compound having a high purity and capable of being used on an industrial scale.

The $SiO_2$ microparticles are generated due to the flame hydrolysis reaction of the OMCTS, based on Formula 2 shown below.

$$[SiO(CH_3)_2]_4 + 16O_2 \rightarrow 4SiO_2 + 8CO_2 + 12H_2O \quad \text{Formula 2:}$$

In this way, when a halogen-free organic silicon compound, represented by OMCTS, is used as the silicon compound raw material supplied to a burner, hydrochloric acid is not generated. Therefore, the degree of freedom for the manufacturing apparatus materials and for handling the exhaust gas is increased. Furthermore, there is no need to provide equipment for performing recover processing of hydrochloric acid, and therefore it is expected that the cost will be kept down.

When the organic silicon compound raw material, represented by OMCTS, is supplied to the burner in a liquid state, the OMCTS is vaporized and combusted irregularly by the burner, and therefore the ejection amount of the $SiO_2$ microparticles becomes unstable, and the flame temperature changes to cause instability in the deposition amount of the $SiO_2$ microparticles and the density of the deposition body.

On the other hand, when the organic silicon compound raw material that has been vaporized is supplied to the burner, there are cases where this raw material reliquefies inside the pipe leading to the burner. There is a method of heating the raw material gas pipe in order to prevent reliquefaction before the gas reaches the burner, but in this case, the burner moves back and forth along the longitudinal direction of the starting member onto which the $SiO_2$ microparticles are deposited, and therefore the raw material gas pipe must be made longer according to the length of the starting member, and there are cases where heating unevenness occurs in the pipe so that the raw material gas reliquifies locally at low-temperature portions or raw material polymers are generated locally at high-temperature portions to block the pipe.

It is an objective of the present invention to provide a manufacturing apparatus and a manufacturing method of a porous glass preform for optical fiber, that are capable of using an organic silicon compound raw material in a liquid state as the silicon compound raw material, preventing localized reliquefaction due to uneven heating in the pipe leading to the burner and blockage of the pipe caused by localized polymer generation due to uneven heating, and performing stable deposition of the $SiO_2$ microparticles onto the starting member.

SUMMARY

The manufacturing method of a porous glass preform for optical fiber according to the present invention solves the above problem, and is a manufacturing method of a porous glass preform for optical fiber by depositing glass microparticles on a starting member, comprising supplying a vaporizer with organic silicon compound raw material in a liquid state and a carrier gas; in the vaporizer, mixing together and vaporizing the organic silicon compound raw material in a liquid state and the carrier gas to convert the organic silicon compound raw material and the carrier gas into a raw material mixed gas; supplying a burner with the raw material mixed gas and a combustible gas, combusting the raw material mixed gas and the combustible gas in the burner, and ejecting $SiO_2$ microparticles generated by the combustion from the burner; and depositing the $SiO_2$ microparticles ejected from the burner by repeatedly moving the vaporizer and the burner together, in a synchronized manner, parallel to the starting member in a longitudinal direction thereof.

It is preferable that the organic silicon compound raw material is octamethylcyclotetrasiloxane (OMCTS) with a purity greater than or equal to 99% by mass. An inert gas such as nitrogen, argon, or helium may be used as the carrier gas in the raw material mixed gas, and oxygen may also be mixed into the raw material mixed gas supplied to the burner. Oxygen or a mixed gas including oxygen and an inert gas may be used as the carrier gas.

A manufacturing apparatus for manufacturing a porous glass preform for optical fiber according to the present invention is a manufacturing apparatus for manufacturing a porous glass preform, comprising a burner that deposits $SiO_2$ microparticles on a starting member while moving parallel thereto along a longitudinal direction of the starting member; a vaporizer that converts organic silicon compound raw material from a liquid state into a gaseous state, and supplies the converted gas to the burner; and a raw material liquid pipe that supplies the organic silicon compound raw material to the vaporizer, wherein the vaporizer and the burner are arranged in a manner to be movable together. It is preferable that the raw material liquid pipe is mobile in a manner to move following the burner.

According to the present invention, in particular, by moving the burner and the vaporizer, which vaporizes the organic silicon compound raw material, is a synchronized and integrated manner, the raw material is stably supplied to the burner in a gaseous state, and the $SiO_2$ microparticle ejection amount and flame temperature are stabilized. Furthermore, it is possible to achieve extremely beneficial effects such as being able to give the raw material gas pipe leading from the vaporizer to the burner a constant length that is unrelated to the region in which the burner moves, being able to shorten the raw material gas pipe relative to the length of the starting member in the longitudinal direction and making it easy to uniformly heat the raw material gas pipe.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
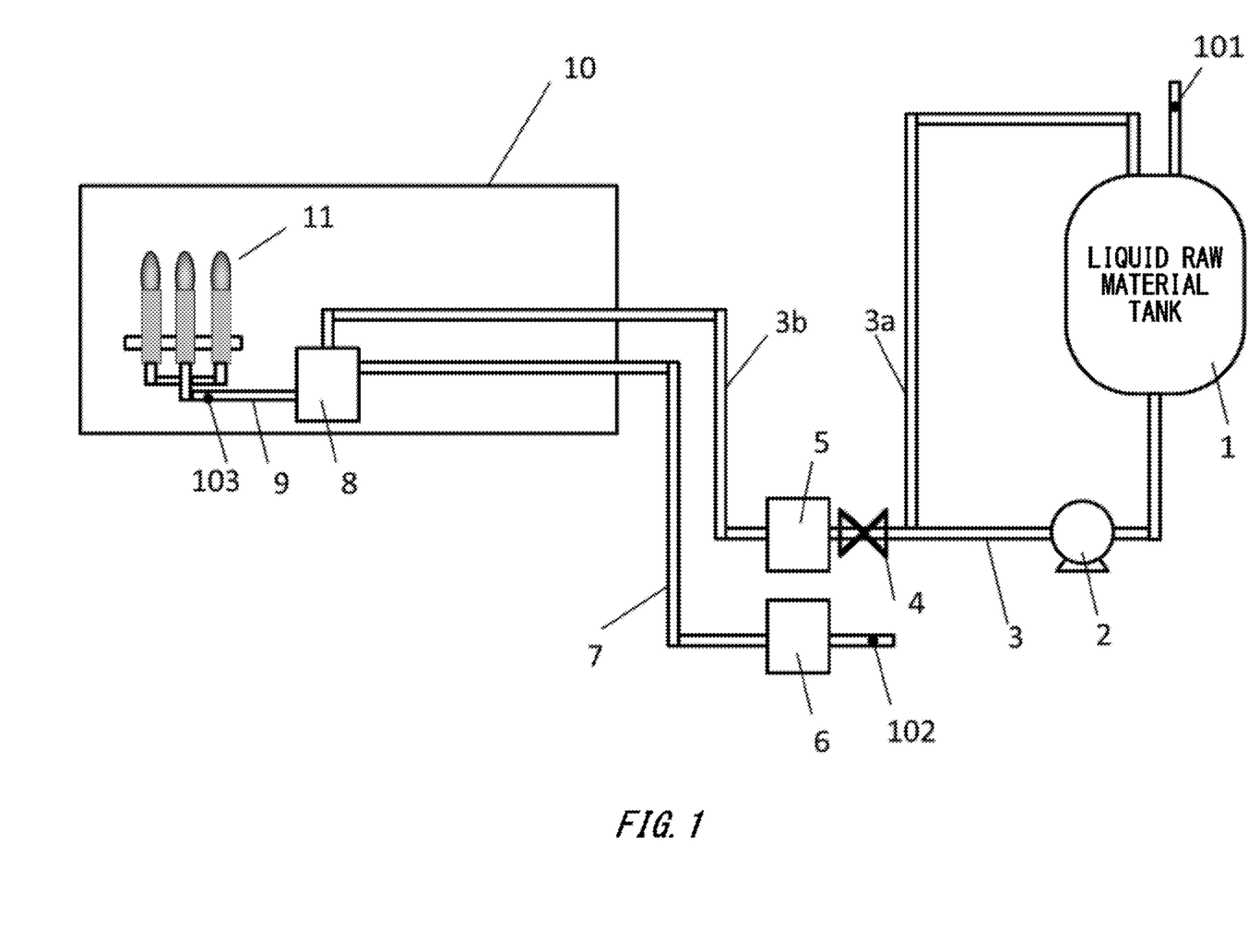
FIG. 1 shows an example of the supply flow for supplying raw material gas and the like to a porous glass preform manufacturing apparatus according to an embodiment of the present invention.

FIG. 1 shows an example of a supply flow for supplying raw material and the like to a porous glass preform manufacturing apparatus according to the present invention.

An organic silicon compound (raw material) 101 in a liquid state is fed from a liquid raw material tank 1. The method for feeding the raw material liquid 101 from the liquid raw material tank 1 may be using a liquid feeding pump 2, gas pumping, or the like, for example. In FIG. 1, a case is shown where the liquid feeding pump 2 is used. A raw material liquid pipe 3 is separated into a circulation pipe 3a that returns to the liquid raw material tank 1 and a raw material liquid supply pipe 3b that goes toward a porous glass preform manufacturing apparatus 10 via a valve 4. A liquid mass flow controller 5 that precisely controls the flow rate of the raw material liquid 101 is provided on the raw material liquid supply pipe 3b side.

The raw material liquid pipe 3 preferably heats the raw material liquid 101 to a point that does not cause coagulation. A vaporizer 8 that vaporizes the raw material liquid 101 is arranged inside the porous glass preform manufacturing apparatus 10. The vaporizer 8 is also supplied with a carrier gas 102, the raw material liquid 101 is mixed with the carrier gas 102 in the vaporizer 8, and the resulting gas is supplied to a burner 11 through a raw material gas pipe 9 as a raw material gas 103. A gas mass flow controller 6 is provided on the carrier gas pipe 7.

The raw material liquid 101 is provided while the liquid mass flow controller 5 changes the supply flow rate thereof from 10 g/min to 100 g/min, according to the deposition state.

The carrier gas 102 can be an inert gas such as nitrogen, argon, or helium, or may be oxygen or a mixed gas including oxygen and an inert gas. The carrier gas 102 may undergo preheating according to the supply flow rate, in order to efficiently vaporize the raw material liquid 101 with the vaporizer 8.

By using an inert gas such as nitrogen, argon, or helium as the carrier gas 102, it is possible to safely transport the raw material. On the other hand, it is undesirable to significantly increase the ratio of the inert gas, since it is unrelated to the reaction. If an inert gas such as nitrogen is used as the carrier gas 102, the flow rate of the carrier gas 102 is preferably restricted to being less than or equal to 30 SLM.

If oxygen or a mixed gas of oxygen and inert gas is used as the carrier gas 102, complete combustion is encouraged by pre-mixing the raw material in the vaporizer.

The supply amount of the oxygen is preferably an amount that does not cause flashback.

The raw material liquid 101 is mixed with the carrier gas 102 in the vaporizer 8 and vaporized. If OMCTS is used as the organic silicon compound raw material, from the viewpoint of efficiently vaporizing the raw material liquid 101 and preventing polymerization of the raw material, the temperature inside the vaporizer 8 is preferably set from 150° C. to 250° C. The raw material gas 103 including the vaporized raw material gas and the carrier gas is supplied to the burner 11 through the raw material gas pipe 9. The raw material gas pipe 9 is preferably heated to a temperature that is greater than a liquefaction temperature of the raw material gas, which is calculated from the partial pressure, in order to prevent reliquefaction of the raw material gas. Specifically, the liquefaction temperature of OMCTS is 175° C. when the partial pressure is 1.00 atm and is 134° C. when the partial pressure is 0.30 atm. The heating of the raw material gas pipe 9 can be achieved using an electric heater, for example.

In order to encourage complete combustion of the raw material, as described above, the carrier gas such as oxygen is mixed with the raw material gas in the vaporizer 8, and the resulting gas is supplied to the burner 11 in a pre-mixed state. If the combustion reaction of the raw material is insufficient, a gel of impurities, impurity microparticles, or the like stick to the burner 11, carbon sticks to the soot, and defects occur in the soot. Therefore, by using oxygen as the carrier gas 102, pre-mixing the raw material and the oxygen, and supplying the resulting gas to the burner 11, it is possible to increase the reactivity of the raw material. In this way, oxygen may be used as the carrier gas 102 and this oxygen may be mixed with the raw material in the vaporizer 8, or inert gas such as nitrogen may be used as the carrier gas 102 and mixed with the raw material downstream from the vaporizer 8.

Figure 2:
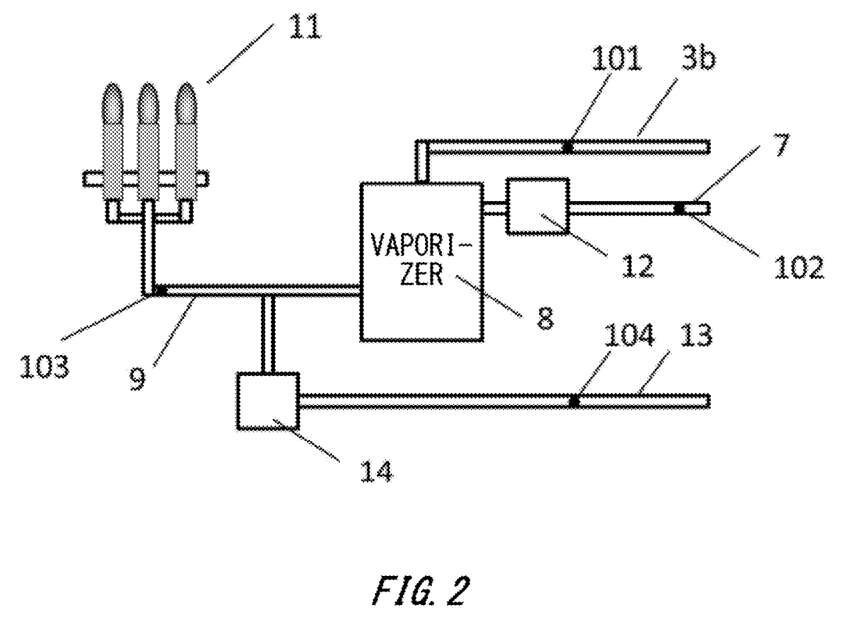
FIG. 2 shows an example of a supply flow around the vaporizer that mixes the oxygen with the raw material gas downstream from the vaporizer, according to an embodiment of the present invention.

FIG. 2 shows an example of a supply flow around the vaporizer according to the present embodiment, and shows a case where an inert gas such as nitrogen is used as the carrier gas 102, oxygen 104 is mixed with the raw material gas downstream from the vaporizer 8, and the resulting gas is supplied to the burner 11.

The oxygen 104 is mixed with the raw material gas downstream from the vaporizer 8, through an oxygen pipe 13. The oxygen is preferably supplied in a preheated state at a temperature greater than or equal to the liquefaction temperature of the raw material gas calculated from the partial pressure, in order to prevent reliquefaction of the raw material. The heating of the oxygen 104 can be achieved using a small-scale heat exchanger 14 or the like. In order to efficiently vaporize the raw material liquid 101 in the vaporizer 8, the carrier gas 102 may be preheated using a small-scale heat exchanger 12 or the like, according to the supply flow rate of the carrier gas 102. The supply flow rate of the oxygen 104 preferably has a molar ratio (standard state) for the oxygen 104/raw material liquid 101 that is less than or equal to 8.

With the manufacturing method of the porous glass preform for optical fiber according to the present invention, a multi-nozzle burner in which a plurality of nozzles are arranged, a multi-tube burner in which nozzles are arranged concentrically, or the like can be used as the burner 11.

The gas supplied to the burner 11 is exemplified by, in addition to the raw material gas pre-mixed with the carrier gas 102 or the like, seal gas, combustible gas for combustion, oxygen gas for combustion, and the like. Hydrogen, methane, ethane, propane, or the like, for example, can be used as the combustible gas for combustion. Octamethylcyclotetrasiloxane (OMCTS), hexamethyldisiloxane, hexamethylcyclotrisiloxane, decamethylcyclopentasiloxane, dodecamethylcyclohexasiloxane, trimethoxymethylsilane, tetramethoxysilane, or the like can be used as the organic silicon compound raw material. The boiling points of these materials are less than or equal to 300° C., and a pipe made of resin such as PTFE can be used as the pipe for the vaporized raw material gas.

In the present invention, it is possible to use mixed raw material in which a plurality of types of organic silicon compound raw materials are mixed together, but from the viewpoint of reaction stability and ease of pipe temperature management, it is preferable to use a single type of raw material with high purity. For example, if OMCTS is used, it is referable for the purity thereof to be greater than or equal to 99% by mass. OMCTS is prone to containing hexamethylcyclotrisiloxane, which is a trimeric cyclic siloxane, and decamethylcyclopentasiloxane, which is a pentameric cyclic siloxane, as impurity components. These impurity components have different reactivities and boiling temperatures than the OMCTS. Accordingly, by increasing the purity of the OMCTS, the heating temperature of the raw material gas pipe only needs to match the boiling point of the OMCTS, and temperature management of the pipe becomes easier. Furthermore, the occurrence of polymerization products due to the reaction of the highly reactive hexamethylcyclotrisiloxane proceeding is prevented, and there is no need to excessively increase the heating temperature of the raw material gas pipe in order to match the high boiling point of the decamethylcyclopentasiloxane.

An inert gas such as nitrogen, argon, or helium, oxygen, or a mixed gas containing oxygen and inert gas can be used as the seal gas. The seal gas may be provided heated, in order to prevent reliquefaction of the raw material gas.

Figure 3:
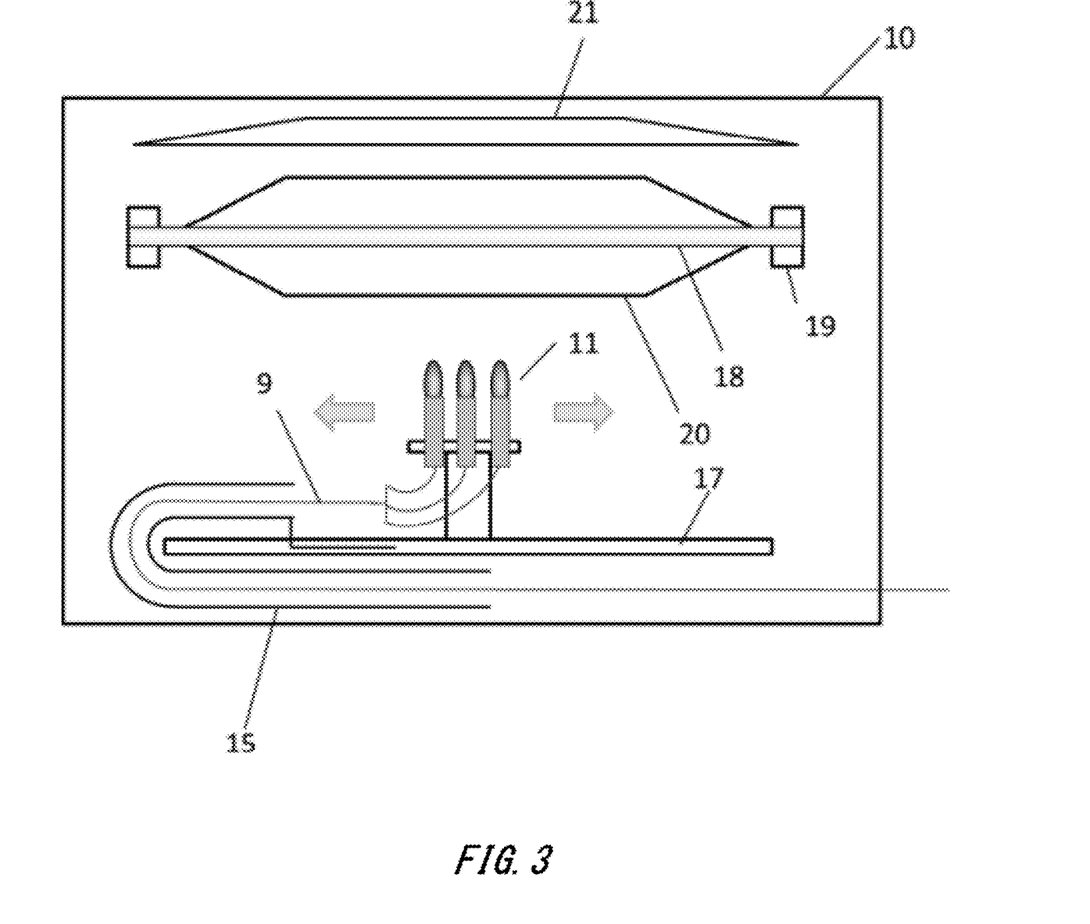
FIG. 3 is a schematic view of the porous glass preform manufacturing apparatus according to an embodiment of the present invention.

FIG. 3 is a schematic view of the porous glass preform manufacturing apparatus used in the present invention.

The burner 11 is moved parallel to a guide mechanism 17 using a traverse motor, not shown in the drawings. A starting core preform 18 is attached to a rotating mechanism 19, and rotates in a certain direction. While the burner 11 repeats the parallel motion along the longitudinal direction of the starting core preform 18, the $SiO_2$ microparticles generated by the raw material gas are ejected from the burner 11, and these microparticles are attached to the starting core preform 18 to form a soot deposition body 20. The unattached $SiO_2$ microparticles that did not attach to the soot deposition body 20 are expelled outside the system via an exhaust hood 21. The exhaust hood 21 may have localized exhaust structures or an overall exhaust structure.

Each gas pipe that supplies the raw material gas and the like to the burner 11 moves in a manner to follow the burner 11 that repeats the parallel movement. At this time, each pipe supplying gas to the burner 11 is preferably mobile, and by storing each gas pipe inside a mobile cable protection material 15 such as Cableveyor (Registered Trademark of TSUBAKIMOTO CHAIN CO.) or a flexible tube, for example, the gas pipes can follow the movement of the burner 11 and can move without experiencing a large amount of stress. The mobile cable protection material 15 is made from a flexible cylindrical member, and stores each gas cable therein.

Figure 4:
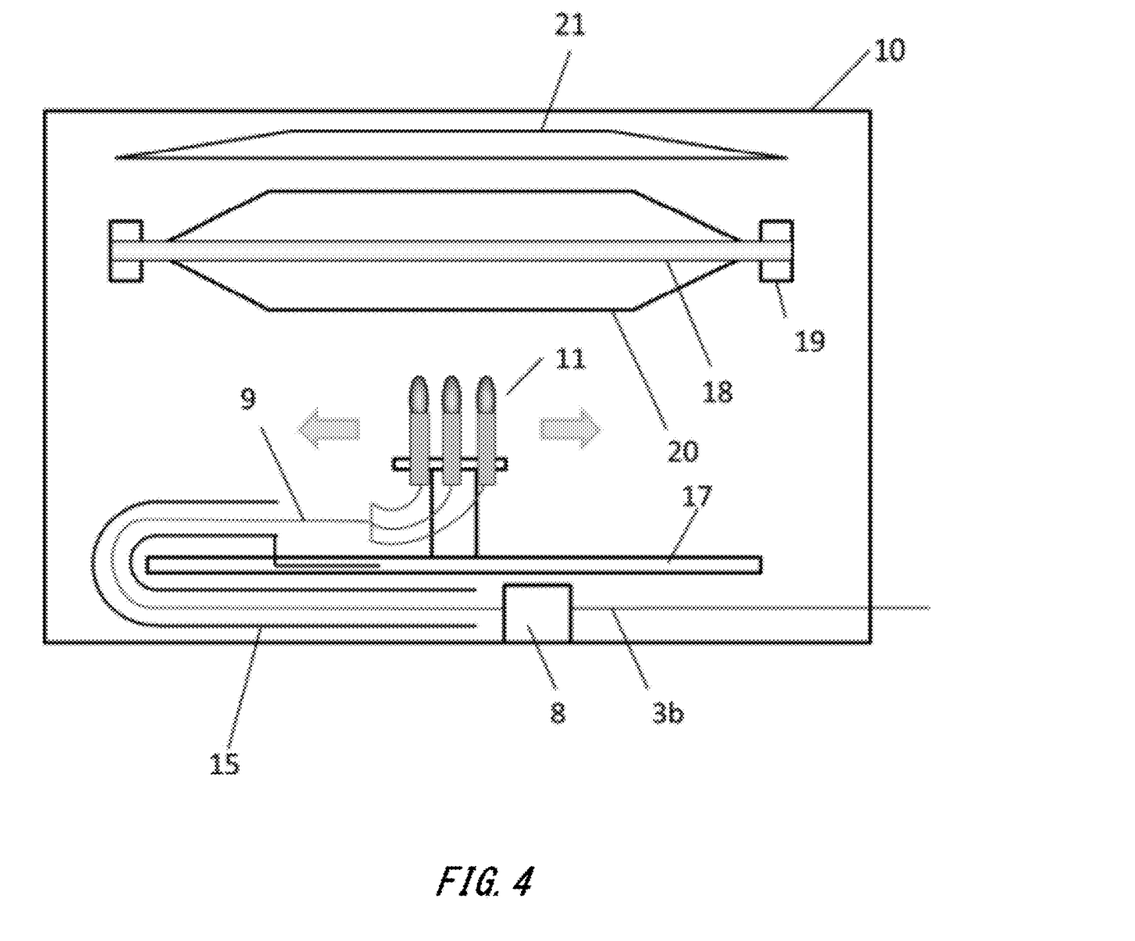
FIG. 4 is a schematic view of an installation position of a vaporizer according to a comparative example.

In a case where the vaporizer 8 that vaporizes the organic silicon compound with such a configuration is arranged secured to a front portion of the mobile cable protection material 15, the raw material gas pipe 9 extending from the vaporizer 8 to the burner 11 needs to be lengthened according to the length of the starting core preform 18 in the longitudinal direction and the pipe length of the raw material gas pipe 9 needs to be 2 to 3 times the movement distance of the burner in one direction, as shown in FIG. 4. For example, if the length of the starting core preform 18 is 3000 mm, the travel distance of the burner in one direction must be 3000 mm, and therefore the pipe length of the raw material gas pipe 9 must be from 6000 mm to 9000 mm.

In order for the raw material gas pipe 9 to prevent reliquefaction of the raw material gas, the raw material gas pipe 9 is preferably heated, using an electric heater or the like, to a temperature greater than or equal to the liquefaction temperature of the raw material gas calculated from the partial pressure. However, it is easy for temperature unevenness to occur in the pipe according to the distance from the electric heater, and it is difficult to control the temperature of the pipe to be uniform. If the vaporizer 8 is arranged secured to the front portion of the mobile cable protection material 15, the length of the raw material gas pipe 9 is increased, and therefore there are cases where the raw material component or impurity component is overheated locally to create polymers in the pipe and is condensed and liquefied at localized low-temperature portions.

Figure 5:
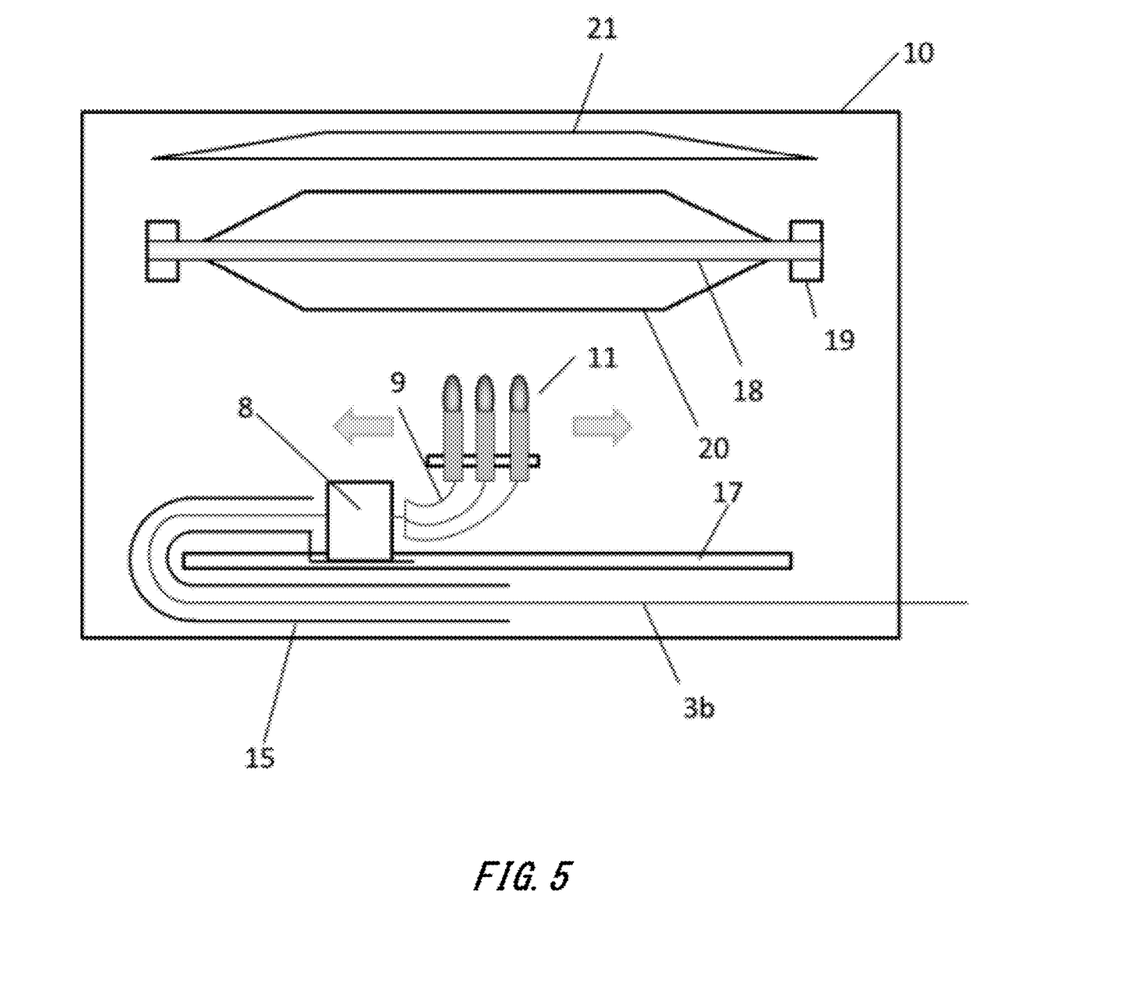
FIG. 5 is a schematic view of the installation position of the vaporizer according to an embodiment of the present invention.

Therefore, in the present embodiment, as shown in FIG. 5, the vaporizer 8 that vaporizes the organic silicon compound in a liquid state is arranged at the rear portion of the mobile cable protection material 15, i.e. near the burner 11, and is arranged to be movable along with the burner 11 that moves due to the guide mechanism 17.

In this way, the raw material gas pipe 9 can be set to have a certain length that is unrelated to the length of the starting core preform 18 in the longitudinal direction, and it is possible to significantly shorten the raw material gas pipe 9 leading from the vaporizer 8 to the burner 11 and to shorten the heating region of the electric heater for preventing the reliquefaction of the raw material gas. As a result, it is possible to restrict the generation of polymerization products within the raw material gas pipe 9, and to heat the raw material gas pipe 9 using the heater without applying excessive tensile stress or bending stress. By making the pipe as short as possible, it is possible to easily manage the temperature of the pipe and to prevent coagulation of the raw material and generation of polymers within the pipe.

When the raw material gas pipe 9 heated by the heater is stored inside the mobile cable protection material 15 and the electric heater for heating the pipe is used, the heater is prone to breaking due to fatigue, and when a heat transfer medium is used, the pipe for the heat transfer medium is easily damaged due to fatigue. Therefore, when heating the raw material gas pipe 9, it is preferable to arrange the heating means such that excessive tensile stress and bending stress is not applied thereto, and the raw material gas pipe itself is preferably not mobile.

What is claimed is:

1. A manufacturing method of a porous glass preform for optical fiber by depositing glass microparticles on a starting member, the manufacturing method comprising:
    supplying a vaporizer with organic silicon compound raw material in a liquid state and a carrier gas;
    in the vaporizer, mixing together and vaporizing the organic silicon compound raw material in a liquid state and the carrier gas to convert the organic silicon compound raw material and the carrier gas into a raw material mixed gas;
    supplying a burner with the raw material mixed gas and a combustible gas, combusting the raw material mixed gas and the combustible gas in the burner, and ejecting $SiO_2$ microparticles generated by the combustion from the burner; and
    depositing the $SiO_2$ microparticles ejected from the burner on the starting member by repeatedly moving the vaporizer and the burner together, in a synchronized manner, parallel to the starting member in a longitudinal direction thereof.

2. The manufacturing method of a porous glass preform for optical fiber according to claim 1, wherein
    the organic silicon compound raw material is octamethylcyclotetrasiloxane (OMCTS) with a purity greater than or equal to 99% by mass.

3. The manufacturing method of a porous glass preform for optical fiber according to claim 1, wherein
    an inert gas such as nitrogen, argon, or helium is used as the carrier gas in the raw material mixed gas.

4. The manufacturing method of a porous glass preform for optical fiber according to claim 3, wherein
    oxygen is also mixed into the raw material mixed gas to be supplied to the burner.

5. The manufacturing method of a porous glass preform for optical fiber according to claim 1, wherein
    oxygen or a mixed gas including oxygen and an inert gas is used as the carrier gas.

6. The manufacturing method of a porous glass preform for optical fiber according to claim 1, wherein
    a raw material gas pipe that supplies raw material gas from the vaporizer to the burner is stored in a flexible mobile cable protection material, and
    the depositing includes moving the burner while guiding the burner with a guide mechanism.

7. The manufacturing method of a porous glass preform for optical fiber according to claim 1, further comprising:
    heating a raw material gas pipe that supplies raw material gas from the vaporizer to the burner.

8. A manufacturing apparatus for manufacturing a porous glass preform for optical fiber, comprising:
    a burner that deposits $SiO_2$ microparticles on a starting member while moving parallel thereto along a longitudinal direction of the starting member;
    a vaporizer that converts organic silicon compound raw material from a liquid state into a gaseous state, and supplies the converted gas to the burner; and
    a raw material liquid pipe that supplies the organic silicon compound raw material to the vaporizer, wherein
    the vaporizer and the burner are arranged in a manner to be movable together.

9. The manufacturing apparatus for manufacturing a porous glass preform for optical fiber according to claim 8, wherein
    the raw material liquid pipe is mobile in a manner to move following the burner.

10. The manufacturing apparatus for manufacturing a porous glass preform for optical fiber according to claim 8, further comprising:
    a guide mechanism that guides the movement of the burner;
    a raw material gas pipe that supplies a raw material gas from the vaporizer to the burner; and
    a mobile cable protection material that is flexible and stores the raw material gas pipe.

11. The manufacturing apparatus for manufacturing a porous glass preform for optical fiber according to claim 8, further comprising:
    a raw material gas pipe that supplies a raw material gas from the vaporizer to the burner; and
    a heater that heats the raw material gas pipe.

* * * * *